United States Patent
Ferguson et al.

(10) Patent No.: US 7,563,341 B2
(45) Date of Patent: Jul. 21, 2009

(54) METHOD FOR THERMALLY PRINTING A DYE IMAGE ONTO A THREE DIMENSIONAL OBJECT USING FLEXIBLE HEATING ELEMENTS

(75) Inventors: Patrick Ferguson, North Shields (GB); Paul Geoffrey Newton, Cleadon Sunderland (GB); Kenneth Neri, Cranston, RI (US)

(73) Assignee: Key-Tech, Inc., Warwick, RI (US)

( * ) Notice: Subject to any disclaimer, the term of this patent is extended or adjusted under 35 U.S.C. 154(b) by 53 days.

(21) Appl. No.: 10/560,874

(22) PCT Filed: Jun. 25, 2004

(86) PCT No.: PCT/US2004/020225

§ 371 (c)(1),
(2), (4) Date: Dec. 14, 2005

(87) PCT Pub. No.: WO2005/004054

PCT Pub. Date: Jan. 13, 2005

(65) Prior Publication Data

US 2006/0283344 A1    Dec. 21, 2006

Related U.S. Application Data

(60) Provisional application No. 60/482,732, filed on Jun. 26, 2003.

(51) Int. Cl.
| | | |
|---|---|---|
| B32B 37/10 | (2006.01) | |
| B32B 37/06 | (2006.01) | |
| B32B 37/14 | (2006.01) | |
| B44C 1/16 | (2006.01) | |
| B65C 9/24 | (2006.01) | |
| H05B 3/34 | (2006.01) | |
| B32B 37/16 | (2006.01) | |
| B44C 1/17 | (2006.01) | |
| C09J 5/06 | (2006.01) | |

(52) U.S. Cl. .................. 156/285; 156/230; 156/233; 156/272.2; 156/277; 156/322; 219/528; 219/549

(58) Field of Classification Search .............. 156/230, 156/233, 238, 285, 499, 583.1–583.91, 272.2, 156/277, 322; 219/265, 528, 549
See application file for complete search history.

(56) References Cited

U.S. PATENT DOCUMENTS 3,888,719 A * 6/1975 Gibbs et al. ................ 156/378

(Continued)

FOREIGN PATENT DOCUMENTS

| WO | 0196123 A1 | 12/2001 |
|---|---|---|
| WO | 02072301 A1 | 9/2002 |
| WO | 03053101 A1 | 6/2003 |

*Primary Examiner*—Philip C Tucker
*Assistant Examiner*—Sonya Mazumdar
(74) *Attorney, Agent, or Firm*—Barlow, Josephs & Holmes, Ltd.

(57) ABSTRACT

The present invention relates to a method for thermally printing a pre-selected dye image (45) onto a three dimensional object (16). The method involves placing an image carrier sheet (24) containing a pre-selected dye image (45) over the object (16). A flexible membrane (26) is lowered over the object (16) and the image carrier sheet (24). A vacuum is established under the membrane (26) causing the image carrier sheet (24) to conform to the shape of the object (16). The membrane (26) or image carrier sheet (24) carry flexible heating elements (36), which are heated, to thermally transfer the dye image (45) onto the object (16). The flexible heating elements (36) can be made by etching an electrical circuit in a metal foil (34) which is bonded to a film substrate (30).

12 Claims, 6 Drawing Sheets

U.S. PATENT DOCUMENTS

| | | | |
|---|---|---|---|
| 3,956,552 A * | 5/1976 | Geary | 428/88 |
| 4,314,814 A | 2/1982 | Derode | |
| 4,662,966 A * | 5/1987 | Sumi et al. | 156/230 |
| 4,670,084 A | 6/1987 | Durand | |
| 4,792,376 A | 12/1988 | Denley | |
| 5,308,426 A | 5/1994 | Claveau | |
| 5,630,894 A * | 5/1997 | Koch et al. | 156/64 |
| 5,641,372 A | 6/1997 | Okuno | |
| 5,893,964 A | 4/1999 | Claveau | |
| 6,136,126 A | 10/2000 | Fenzi | |
| 6,483,087 B2 | 11/2002 | Gardner et al. | |
| 7,137,426 B2 * | 11/2006 | Neri et al. | 156/499 |
| 7,267,737 B2 * | 9/2007 | Neri et al. | 156/230 |
| 2002/0131062 A1 | 9/2002 | Neri et al. | |

* cited by examiner

METHOD FOR THERMALLY PRINTING A DYE IMAGE ONTO A THREE DIMENSIONAL OBJECT USING FLEXIBLE HEATING ELEMENTS

CROSS-REFERENCE TO RELATED APPLICATIONS

This application claims the benefit of U.S. Provisional Application No. 60/482,732 having a filing date of Jun. 26, 2003, the entire contents of which are hereby incorporated by reference.

BACKGROUND OF THE INVENTION

The present invention relates to a method for thermally printing a pre-selected dye image onto a three dimensional object using flexible heating elements. Particularly, the heating elements are carried by a dye image carrier sheet or membrane which conforms tightly to the shape of the object during the printing operation.

The dye image carrier sheet and membrane, which carry flexible heating elements in accordance with this invention, can be used with the thermal-transfer printing system described in published United States Patent Application US 2002/0131062 to Neri and Mutter ("'062 Publication"), the disclosure of which is hereby incorporated by reference.

In general, the printing system described in the '062 Publication involves placing an image carrier sheet containing a pre-selected, dye image over a three-dimensional object and thermally-transferring the image to the object. An example of a suitable three-dimensional object is a plastic cover for a cellular telephone or a computer mouse. The three-dimensional object is placed on a bed assembly, and the image carrier sheet is laid over the object. A flexible membrane is drawn over the image carrier sheet by a vacuum. As the vacuum draws the membrane and image carrier sheet into pressurized contact with each other, the carrier sheet is wrapped around the various surfaces of the object. The image carrier sheet and object are maintained in pressurized engagement with each other by the vacuum. Then, the printed dye image on the carrier sheet is transferred to the object by heat. In the '062 Publication, a heating assembly containing multiple tubular heating lamps is located above the bed assembly containing the object. The heating lamps are energized so as to heat the image carrier sheet and thermally-transfer the dye image to the object.

Durand, U.S. Pat. No. 4,670,084 discloses an apparatus, wherein dyes are thermally-transferred from image sheets to objects such as computer keyboards. A flexible membrane is drawn over the image sheet and the image is transferred to the object by heat and pressure. The apparatus includes a hood containing multiple heating lamps and parabolic reflectors which reflect heat radiation from the lamps downwardly onto the object. One drawback with the heating assembly described in the Durand, '084 Patent is that the mounted heat lamps are shown being located at some distance from the image sheet and object that will be printed thereon. The heating lamps may not emit heat radiation uniformly to each area of the sheet and object. As a result, the printed image, which is produced on the object, may be of poor quality.

Denley, U.S. Pat. No. 4,792,376 discloses a different thermal-transfer printing system for printing legends on the keycaps of keyboards. The system includes an air-inflatable heated bladder that applies heat and pressure to a legend-carrying medium such as a paper. According to the '376 patent, the keycaps first must be moved from a keyboard profile to a planar printing profile before the legends are printed on the keycaps. The air-inflatable bladder contains chambers which hold electrically-heated quartz rods. This thermal-transfer printing system also has several drawbacks. Particularly, the legends are only printed on the top surfaces of the keycaps. The keycaps must be arranged in a planar position in order to receive the legends. Also, the heated bladder is not drawn completely over the keycaps. Rather, a printing platen is moved down upon a printing fixture which supports the keycaps and paper medium.

In view of some of the disadvantages with some conventional thermal transfer-printing systems used to print dye images onto three-dimensional objects, there is a need for an improved method. The present invention provides an improved method. In the method of this invention, flexible heating elements are used to thermally-transfer the image onto the object. The flexible heating elements are carried by a dye image carrier sheet or membrane that enwraps the object, or by both the image carrier sheet and membrane. When energized, the heating elements apply heat uniformly to the image carrier sheet and the dye image is transferred to the object completely and cleanly. The printed image, which is produced on the object, has good print resolution, brightness, and overall quality. These and other objects, features, and advantages of this invention are evident from the following description and illustrated embodiments.

SUMMARY OF THE INVENTION

This invention relates generally to an improved method for thermally printing a pre-selected dye image onto a three dimensional object.

Particularly, the method involves simultaneously applying a pre-selected dye image to multiple surfaces of a three dimensional object using a flexible heating element as a heat source. In one embodiment, the method generally involves the steps of: a) providing a three dimensional object having an outer plastic surface for receiving an image, wherein the object has a top surface and a plurality of side surfaces which are adjacent to and not co-planar with the top surface; b) placing a dye image carrier sheet in registration over the object, wherein the image carrier sheet has a pre-selected dye image printed thereon; c) lowering a flexible membrane over the three dimensional object and image carrier sheet; d) establishing a vacuum under the membrane to cause the image carrier sheet to conform into pressurized communication with the top surface and side surfaces of the object; and e) heating the image carrier sheet to cause the image to transfer from the carrier sheet onto the top surface and side surfaces of the object.

The image carrier sheet and/or flexible membrane can be preheated either before or after the step of establishing the vacuum. This preheating step improves the flexibility of the carrier sheet and/or membrane.

The improved aspect of this method involves using flexible heating elements that are carried by the membrane or dye image carrier sheet, or both the membrane and image carrier sheet to effect the transfer of the dye image from the carrier sheet to the object. The flexible heating elements can be disposed on any surface of the membrane or image carrier sheet or embedded therein. For the image carrier sheet, it is preferred that the flexible heating elements be disposed on the surface opposite to the surface that receives the pre-selected dye image. The flexible heating elements are used to heat the image carrier sheet to thermally transfer the image onto the object. A wide variety of methods can be used to produce the flexible heating elements. For example, the flexible heating elements can be made by etching an electrical circuit in a metal foil which is bonded to a film substrate.

The membrane can be made from any suitable material such as a silicone rubber. The image carrier sheet can be made from any suitable substrate material such as a film or fabric. The substrate material can be coated with a dye-receptive layer for receiving the pre-selected dye image.

In another embodiment of this invention, a flexible membrane is not used in the thermal transfer printing process. This method includes the steps of: a) providing a three dimensional object having an outer plastic surface for receiving an image, wherein the object has a top surface and a plurality of side surfaces which are adjacent to and not co-planar with the top surface; b) placing a dye image carrier sheet in registration over the object, wherein the image carrier sheet has a pre-selected dye image printed thereon and the image carrier sheet carries a flexible heating element; c) establishing a vacuum under the image carrier sheet to cause the carrier sheet and flexible heating element to conform into pressurized communication with the top surface and side surfaces of the object; and d) heating the image carrier sheet with the flexible heating element to cause the image to transfer from the carrier sheet onto the top surface and side surfaces of the object. The image carrier sheet can be preheated to improve its flexibility before or after the step of establishing the vacuum.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description taken in connection with the accompanying drawings in which:

DETAILED DESCRIPTION OF THE PREFERRED EMBODIMENTS

Figure 1:
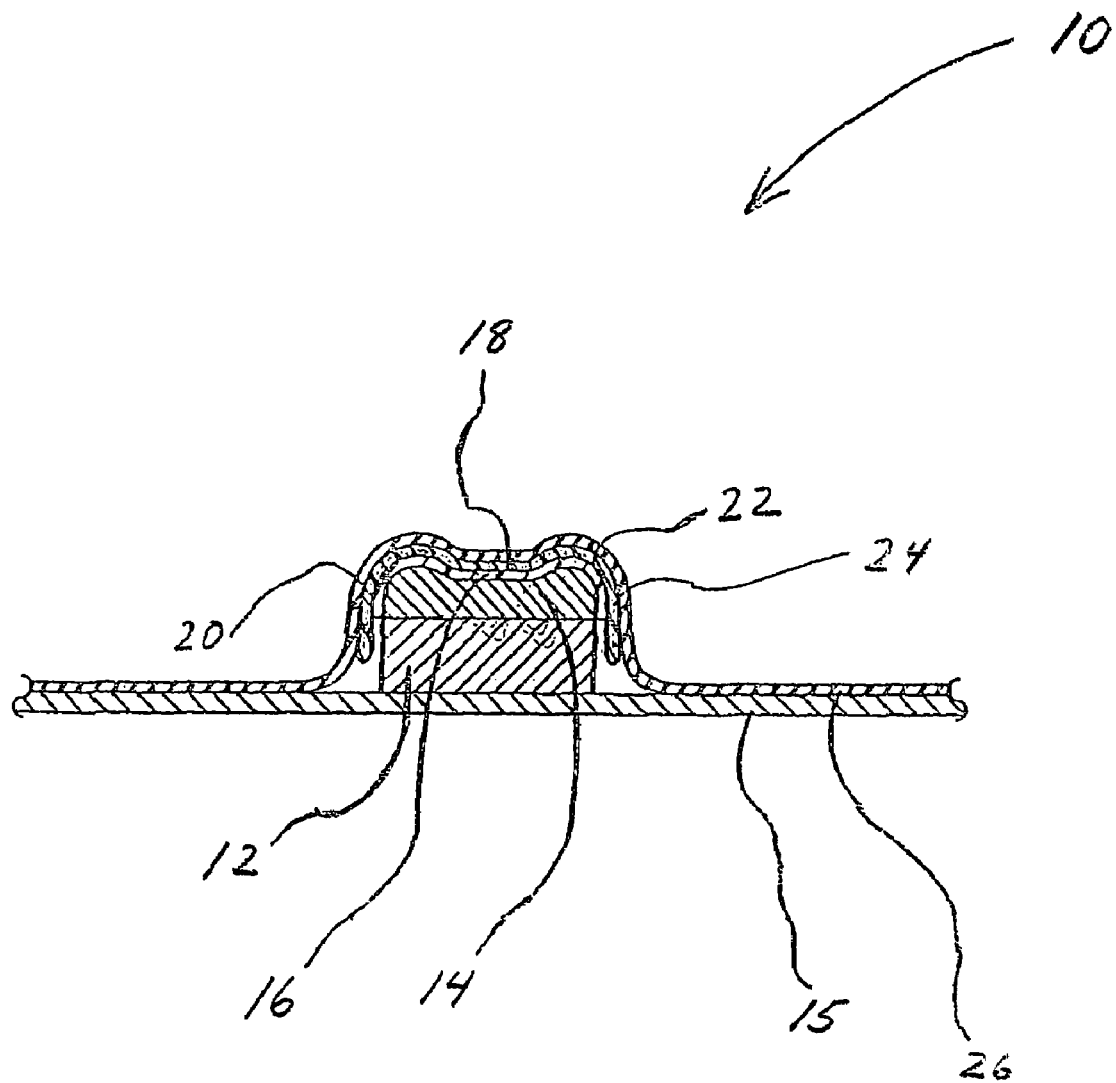
FIG. 1 is a cross-sectional view of the printing assembly used to thermally transfer a dye image from the dye image carrier sheet to an object in accordance with the method of the present invention.

The thermal-transfer printing system, which is described in the aforementioned '062 Publication can be used in accordance with the present invention. Referring to FIG. 1, this printing assembly is generally indicated at 10. The assembly 10 includes a support fixture 12 having a molded base 14 thereon that is designed to support the specific object that will receive the pre-selected dye image. The support fixture 12 and molded base 14 are supported by support plate 15. The molded base 14 can be made from a silicone rubber material. In the embodiment shown in FIG. 1, the object is a plastic cellular telephone case 16. However, it is recognized that the assembly 10 can be used to apply the dye image to any other three dimensional object such as, for example, a computer mouse. As shown in FIG. 1, the assembly 10 can be used to transfer the dye image to a cellular telephone case 16 having a top surface 18 and side surfaces 20 and 22. A vacuum-formable carrier sheet 24 carrying the dye image (not shown) is laid over the telephone case 16. A flexible membrane 26 is placed over the vacuum-formable dye image carrier sheet 24. As a vacuum (not shown) draws the membrane 26 into pressurized contact with the dye carrier sheet 24, the carrier sheet 24 is wrapped around the top surface 18 and side surfaces 20 and 22 of the telephone case 16. The carrier sheet 24 tightly conforms to the irregular surfaces of the telephone case 16 and enwraps the case 16. The carrier sheet 24 and telephone case 16 are maintained in pressurized engagement with each other by the vacuum. Then, the printed dye image on the carrier sheet 24 is transferred to the telephone case 16 by the application of heat.

As discussed above, it is preferable that a flexible membrane 26 be placed over the dye carrier sheet 24 so that the vacuum can draw the membrane 26 into pressurized contact with the carrier sheet 24 and wrap the sheet 24 around the object 16; however, it is not required that a membrane 26 be used in each instance.

It is also recognized that the image carrier sheet 24 can be preheated either before or after the step of establishing the vacuum whether or not a flexible membrane 26 is used in the process. This preheating step improves the flexibility of the carrier sheet. Also, the membrane 26 can be preheated prior to or after applying the vacuum.

The present invention provides an improved method for heat-transferring the dye image to the object 16. Particularly, flexible heating elements are used to heat the image carrier sheet 24 to thermally-transfer the dye image onto the object 16. The image carrier sheet 24 or membrane 26 can carry a flexible heating element in accordance with this method. The method can be practiced, wherein either the image carrier sheet 24 or membrane 26 carries the flexible heating element. The method also can be practiced, wherein both the image carrier sheet 24 and membrane 26 carry the flexible heating element.

Figure 2A:
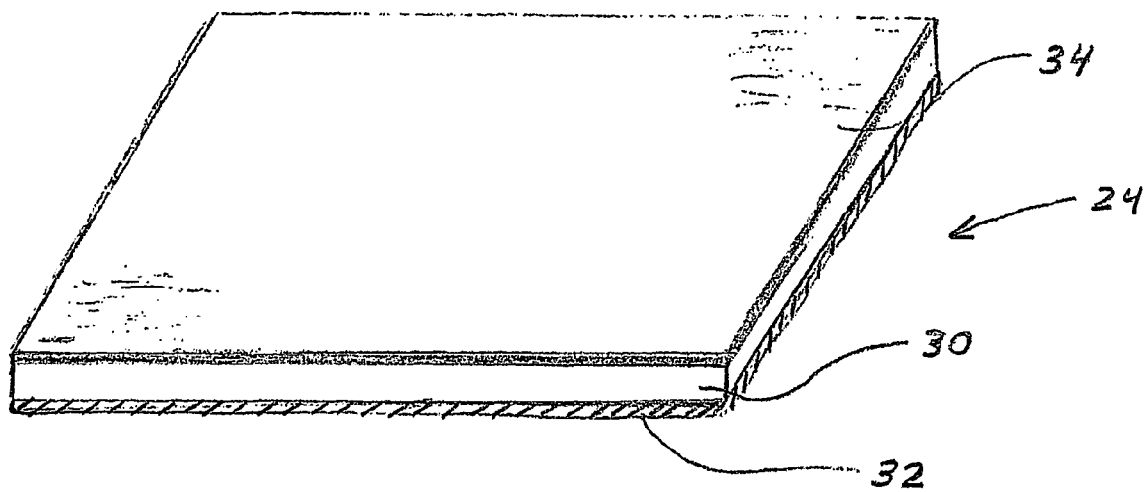
FIG. 2A is a perspective view of one embodiment of the dye image carrier sheet showing a film substrate bonded to a metal foil.
Figure 2B:
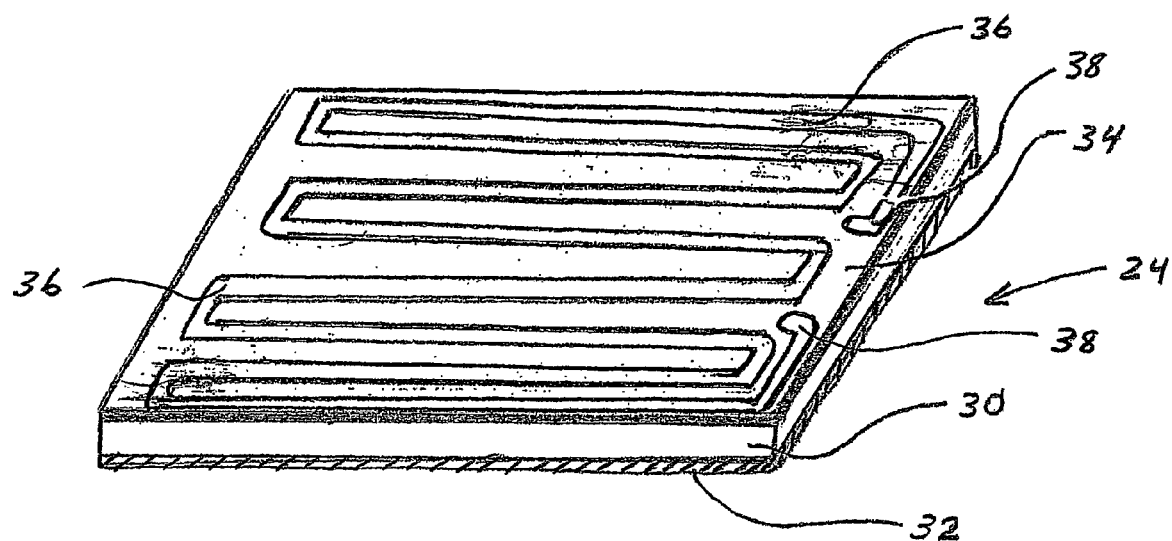
FIG. 2B is a perspective view of the image carrier sheet in FIG. 2A showing an electrical circuit etched in the metal foil.
Figure 2C:
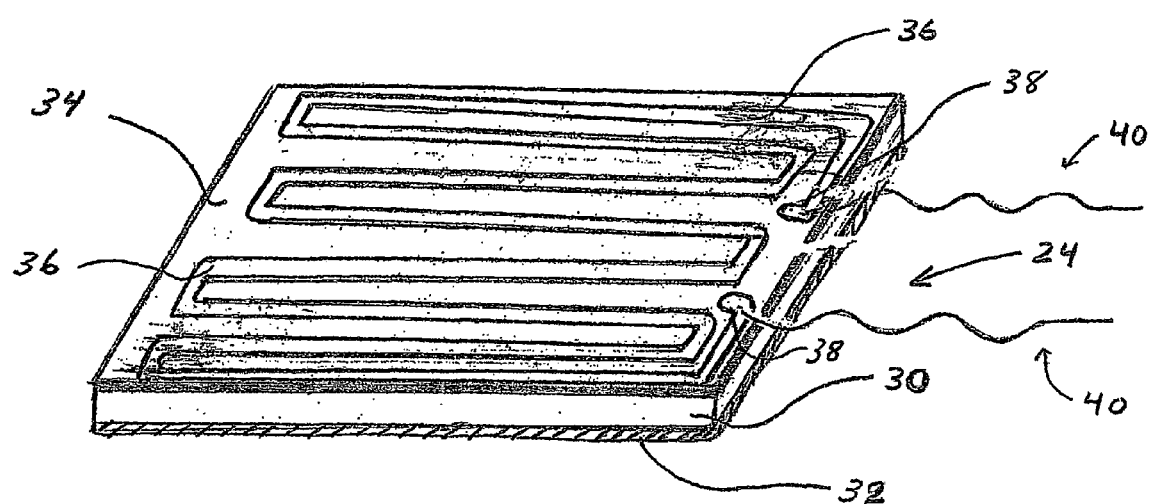
FIG. 2C is a perspective view of the image carrier sheet in FIG. 2B showing lead wires attached to the electrical circuit.
Figure 2D:
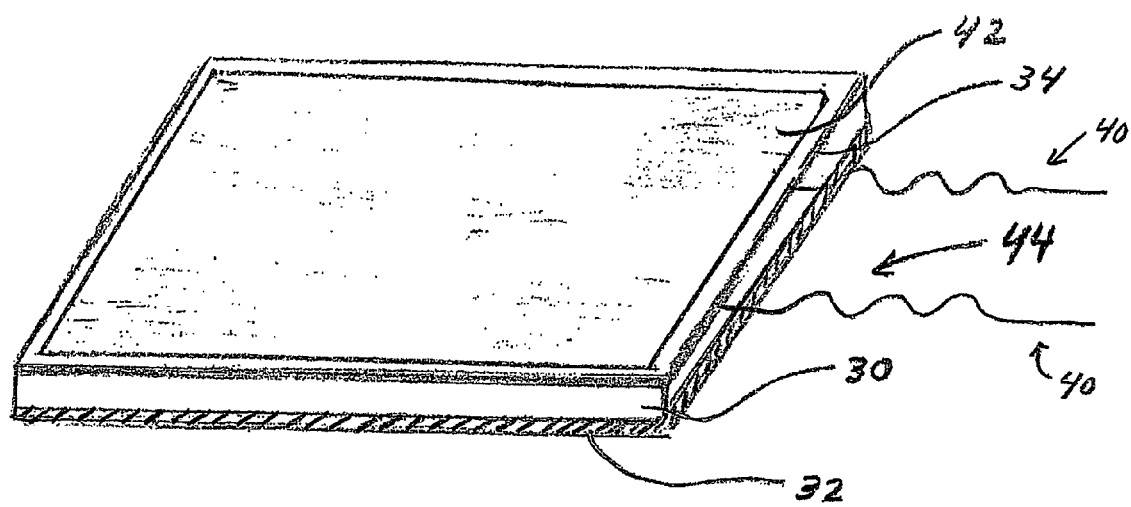
FIG. 2D is a perspective view of the image carrier sheet in FIG. 2C showing an electrically-insulating material bonded over the metal foil.

The heating element can be made and disposed in the image carrier sheet 24 and membrane 26 in any suitable manner. For example, a heating element can by made by etching an electrical circuit in a metal foil which is bonded to the carrier sheet 24 or flexible membrane 26. More particularly, referring to FIGS. 2A-2D, the image carrier sheet is generally indicated at 24. As shown in FIG. 2A, the carrier sheet 24 includes a film substrate 30 having a lower surface which is coated with a dye-receptive layer 32 for receiving the pre-selected dye image (not shown). A SURLYN film, which is available from E.I. du Pont de Nemours and Company, can be used as the film substrate 30. Such SURLYN film materials have good thermoforming and mechanical strength properties as discussed in further detail below. A metal foil 34 has been bonded to the upper surface of the film substrate 30 using conventional adhesives. In FIG. 2B, a flexible heating element 36 has been formed by etching an electrical circuit in the metal foil 34 using etching techniques known in the art. The electrical circuit 36 includes terminal ends 38. In FIG. 2C, lead wires 40 are connected to the terminal ends 38 by soldering, conductive adhesives, or other conventional connecting means. The lead wires can be connected to an electrical power source (not shown). In FIG. 2D, an electrically-insulating material 42 is shown bonded over the etched pattern of flexible heating elements 36 to form a laminate or sandwich structure generally indicated at 44. The electrically-insulating material 42 can be bonded using ordinary adhesives.

The electrically-insulating material 42 used in the laminate structure can be any suitable material that can withstand the relatively high temperatures reached during the printing operation. For example, electrically-insulating films or coatings can be used. More particularly, silicone rubber, polyimide films, and certain heat-resistant lacquers are some examples of such electrically-insulating materials 42. The electrically-insulating material 42 can be reinforced with fibers or other additives. The electrically-insulating material 42 typically has a thickness in the range of about one-tenth (0.1) micron to about fifty (50) microns. Preferably, the electrically-insulating material 42 has a thickness of no greater than ten (10) microns. The metal foil 34 can be any suitable resistive metal or alloy such as aluminum, copper, nickel, chromium, stainless steel, and the like. The metal foil 34 typically has a thickness in the range of about one-tenth (0.1) microns to about fifty (50) microns. Preferably, the electrically-insulating material 42 has a thickness of no greater than twenty-five (25) microns. The resistance of the flexible heating element 36, and consequently the operating temperature, can be controlled by changing the type of metal foil 34, the thickness of the metal foil 34, or the design of the heating elements 36.

A film material is shown as the substrate 30 in FIGS. 2A-2D for illustrative purposes only, and it is understood that other substrate materials 30, such as fabrics, can be used. Such substrate materials 30 are described in further detail below. Furthermore, it is recognized that the heating elements 36 can be disposed on any surface of the substrate 30 and also can be embedded in the substrate. But, the heating elements 36 preferably are disposed on the upper surface of the substrate 30 as shown in FIGS. 2B and 2C. A single heating element 36 or multiple heating elements 36 can be used.

It is important that heating elements 36 have sufficient resiliency and flexibility to conform to the contoured and irregular surfaces of the three dimensional object 16 (FIG. 1). Particularly, the heating elements 36 must be capable of bending and flexing with the carrier sheet 24 and membrane 26 as these materials are vacuum-drawn over the upper 18 and side surfaces 20 and 22 of the object 16. The side surfaces 20 and 22 are not co-planar with the upper surface 18, and it is important for the heating elements 36, carrier sheet 24, and membrane 26 to enwrap the exposed surfaces of the object 16. Also, it is important that the flexible heating elements 36 have high resiliency and mechanical strength so that they can be vacuum-drawn over the shaped surfaces of the object 16 without ripping or tearing. The carrier sheet 24 and membrane 26 structures, which carry the heating elements 36, also should have high mechanical integrity.

Moreover, the carrier sheet 24 and membrane 26 structures must be able to withstand relatively high temperatures. For example, the temperature in the carrier sheet 24 and membrane 26 structures may increase to a temperature in the range of about 100° F. to about 600° F. upon activating the flexible heating elements 36 or in the preheat operation.

The heating elements 36 can be made by etching a conductive pattern in a resistive metal foil 34 and forming a laminate structure 44 as discussed above and as illustrated in FIGS. 2A-2D. Alternatively, other techniques and structures can be used, provided that the resulting heating elements 36 have the properties described herein. For example, the heating elements 36 can be wire-wound elements which can be produced by winding electrical resistance wires around removable fiberglass cores. In other instances, the heating elements 36 can comprise an interwoven carbon fiber sheet or metallized fiber sheet structure such as nickel-coated polyester. More particularly, a metallized, woven fabric mesh structure, which is photochemically etched to form an electric circuit, can be used as the flexible heating element 36. Such metallized fabrics are described in published PCT International Application No. WO 03/053101 (NEL Technologies, Ltd.). A heat-resistant, electrically-insulating lacquer can be applied to the etched metallized fabric by dip-coating, paint-spraying, or other suitable method. Also, a laminated fabric comprising a fabric layer, two bus bars, and two thermoplastic layers as described in Gardner et al., U.S. Pat. No. 6,483,087 can be used as the flexible heating elements 36. In still other embodiments, the flexible heating elements 36 can be made with conductive coatings or inks. In addition, screen-printed circuits can be used as the heating elements 36. Also, circuits, which are produced by the vapor deposition or sputtering of metals, can be used as the heating elements 36.

Thus, the heating elements 36 can be formed as integral components of the carrier sheet 24 structure using such methods as discussed above. Alternatively, the heating elements 36 can be produced as separate components that are bonded subsequently to the carrier sheet 24. For example, flexible, electrically-insulating heating elements 36 can be bonded to the metal foil 34 using pressure-sensitive adhesives. In such instances, the metal foil 34 will provide an optimum thermally conductive pathway for the heating elements 36. These individual heating elements 36 can be made from the same materials as the substrate material 30 using the methods discussed above.

Furthermore, it is recognized that the heating elements 36 can be of any suitable size and shape, provided that they are capable of compensating for any distortion caused by the wrapping process. For example, the heating elements 36 can have a circular, square, rectangular, or tubular shape. The heating elements 36 also can be arranged in any suitable pattern. For example, the heating elements 36 can be arranged in separate parallel paths or in a S-shaped path as shown in FIGS. 2B and 2C.

In FIGS. 2A-2D, the heating elements 36 are connected to lead wires 40. The lead wires 40 can be connected to an electrical power source (not shown) which supplies current to activate the heating elements 36. The voltage of the electrical power source will vary depending upon the design of the image carrier sheet 24, heating elements 36, and intended printing application. For example, the heating elements 36 can be designed to operate with a wattage in the range of about 0.1 watts/cm$^2$ to about 10 watts/cm$^2$. The heating elements 36 can be designed to have relatively low or high electrically resistive properties so that the desired level of electrical power is produced when current is passed through them. In addition, the heating elements 36 can be uniformly spaced apart, as shown in FIGS. 2B and 2C, to produce a uniform level of electrical power across the surface of the carrier sheet 24.

Figure 3:
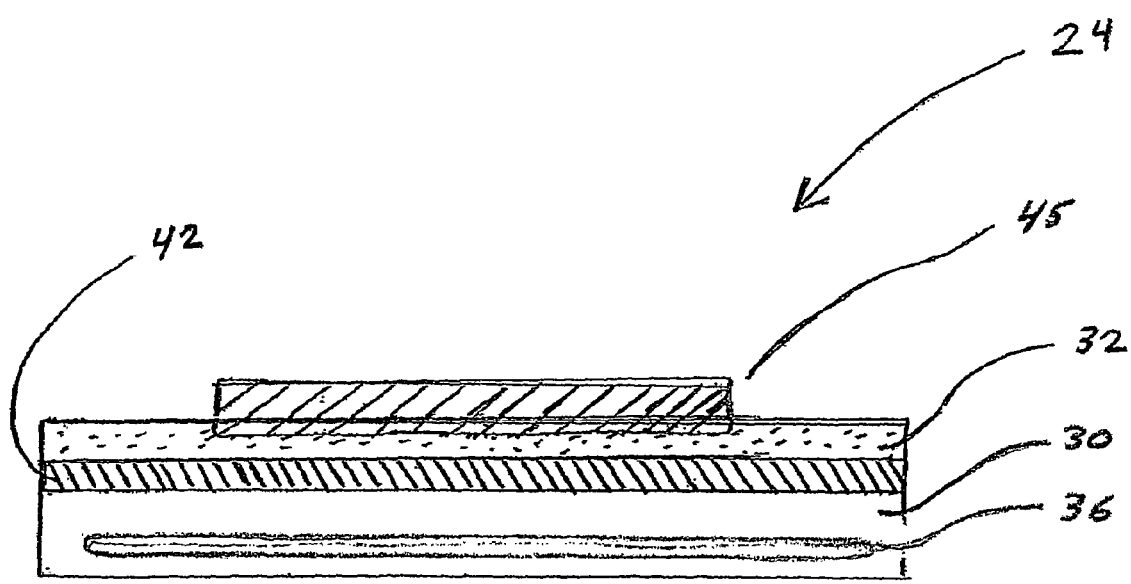
FIG. 3 is a side perspective view of another embodiment of the dye image carrier sheet showing the sheet with an intermediate barrier layer.

Referring to FIG. 3, the dye image carrier sheet 24 is shown in more detail. The carrier sheet comprises a substrate 30. Any suitable material can be used to make the substrate 30. For example, a film material can be used as the substrate 30. Typically, the film material is vacuum-formable, but heat-shrinkable films also can be used in accordance with this invention. Also, fabric materials, such as woven or non-woven fabrics, can be used as the substrate 30. Suitable materials for making the substrate include, for example, ionomer copolymers, polyethylene terephthalate, other polyesters, vinyls (for example, polyvinyl chloride and polyvinyl acetate), polyamides, polyolefins (for example, polyethylene and polypropylene), polyacrylates, polyimides, polystyrenes, polysulfones, aramids, polycarbonates, and the like. In FIG. 3, a film substrate 30 is shown for illustration purposes only. The film substrate 30 carries flexible heating elements 36. The film substrate 30 can be coated with a dye-receptive layer 32. Optionally, at least one intermediate barrier layer 42 can be interposed between the substrate 30 and dye-receptive layer 32 as described in further detail below. A pre-selected dye image 45 is printed onto the dye image carrier sheet 24.

In one preferred embodiment, the substrate 30 is a SURLYN film. The SURLYN film substrate 30 can be used by itself or as a composite with other materials. For instance, the SURLYN film substrate 30 can be co-extruded with nylon. Such SURLYN film substrates are described in co-pending, co-assigned published U.S. Patent Application 2004/0112500 (Ferguson and Neri), the disclosure of which is hereby incorporated by reference. The SURLYN film substrate 30 has several advantageous properties including good thermoforming, high shrink-force, tensile strength, and melt strength properties. Particularly, the SURLYN film substrate 30 is physically strong and can carry the flexible heating elements 36 and withstand high temperatures during the thermal printing operation.

The substrate 30 can be coated with a dye-receptive layer 32 as shown in FIG. 3. For example, a coating formulation comprising pigment and polymer film-forming binder may be prepared and applied as the dye-receptive layer 32 to the substrate 30. The pigment makes the coated layer porous which permits good dye absorption and fixation of the dyes.

Suitable film-forming binders include, for example, poly (vinyl alcohol), poly(vinyl pyrrolidone), gelatins, poly(vinyl acetate), poly(acrylic acids), polyethylene oxide, polyacrylates or polymethacrylates, and cellulose derivatives such as cellulose ethers, carboxymethyl cellulose, and hydroxyethyl cellulose, and proteins, casein, and starch. Suitable pigments include, for example, silica, calcium sulfate, calcium carbonate, alumina, aluminum hydroxide, magnesium hydroxide, magnesium carbonate, barium sulfate, titanium dioxide, zinc oxide, tin oxide, zinc sulfate, zinc carbonate, kaolin, talc, clay, and the like. The dye-receptive layer 32 may contain a sufficient amount of pigment and film-forming binder to effectively absorb the dye and fix the image. For instance, the dye-receptive layer 32 may contain about 20 to about 80% by weight of pigment and about 80 to 20% by weight of polymer binder based on dry weight of the layer.

optionally, at least one intermediate barrier layer 42 can be interposed between the substrate 30 and coated dye-receptive layer 32. The barrier layer 42 can help provide improved heat conduction. The barrier layer 42 can also help prevent the migration of dyes into the film substrate 30. The barrier layer 42 can be a metallized layer or a coated chemically-based layer.

Thermally transferable dyes are applied to the dye-receptive layer 32 to form a pre-selected dye image 45. Any suitable printing technique may be used to print the image 45. A single dye or a mixture of dyes may be incorporated into the printing ink formulations to produce, for example, yellow, magenta, cyan and black inks. The dye image 45 may be any distinctive mark such as, for example, alphabetic letters, numbers, symbols, patterns, geometric shapes, photographs, and the like. The dye image 45 can be printed on the dye-receptive layer 32 so that it is a mirror (backward facing) image. Then, the dye image 45 may be thermally-transferred to the object 16 using the above-described vacuum/heating process, and the image will appear as a true (frontward facing) image on the object 16.

If a sublimation dye is used, the dye image 45 is sublimated and transferred to the desired surfaces of the object 16 by a thermal-transfer process. In a heat fusible-type process, the heat softens the image 45 and the softened image is transferred to the desired surfaces of the object 16. The image 45 can be produced from pigmented inks or plastisols having a melting or softening point which is below the melting point of the object 16 receiving the image 45. Other dyes, inks, and image-imparting media known in the art may also be used in accordance with this invention.

In FIGS. 2B and 2C, an image carrier sheet 24 is shown carrying the flexible heating elements 36. It also is contemplated that the flexible membrane 26 can carry the heating elements 36. The flexible membrane 26 can be made of any suitable material such as, for example, silicone rubber, styrene-butadiene copolymers, polychloroprene, polyurethanes, or other elastomeric material Referring back to FIG. 1, as discussed above, the membrane 26, which carries the flexible heating elements 36, is drawn into pressurized contact with the dye image carrier sheet 24 by applying the vacuum. This action causes the carrier sheet 24 to wrap around the top surface 18 and side surfaces 20 and 22 of the three-dimensional object 16. The carrier sheet 24 tightly conforms to the irregularly shaped surfaces of the object 16. The heating elements 36, which are carried by the image carrier sheet 24 or membrane 26, are activated to provide heat and effectively transfer the dye image 45 from the carrier sheet 45 to the object 16.

The method of this invention produces high quality printed images on the three-dimensional object. The flexible heating elements, which are carried by the image carrier sheet or membrane, are capable of tightly conforming to the top and side surfaces of the three dimensional object with the image carrier sheet and membrane. The generated heat is applied uniformly to each surface of the object, and the dye image is uniformly transferred to produce an excellent printed image.

It is appreciated by those skilled in the art that various changes and modifications can be made to the illustrated embodiments herein without departing from the spirit of the invention. All such modifications and changes are intended to be covered by the appended claims.

What is claimed is:

1. A method of simultaneously applying a pre-selected dye image to multiple surfaces of a three dimensional object, comprising the steps of:

providing a three dimensional object having an outer plastic surface for receiving a dye image, the three dimensional object having a top surface and a plurality of side surfaces adjacent to and not co-planar with the top surface;

placing a dye image carrier sheet in registration over the three dimensional object, the image carrier sheet having a pre-selected dye image printed thereon;

lowering a flexible membrane over the three dimensional object and the image carrier sheet;

pre-heating the flexible membrane;

establishing a vacuum under the membrane, after pre-heating the flexible membrane, to cause the image carrier sheet to conform into pressurized communication with the top surface and side surfaces of the three dimensional object; and heating the image carrier sheet with a flexible heating element to cause the dye image to transfer from the carrier sheet onto the top surface and side surfaces of the three dimensional object.

2. The method of claim 1, wherein the image carrier sheet comprises a substrate having a dye-receptive layer coated thereon.

3. The method of claim 1, wherein the image carrier sheet comprises a film substrate.

4. The method of claim 3, wherein the image carrier sheet comprises a film substrate bonded to a metal foil, the metal foil having an etched electrical circuit therein.

5. The method of claim 1, wherein the image carrier sheet comprises a fabric substrate.

6. The method of claim 5, wherein the image carrier sheet comprises a metallized fabric substrate.

7. The method of claim 6, wherein the metallized fabric is photochemically etched to form an electrical circuit therein.

8. The method of claim 7, wherein the etched metallized fabric is coated with a heat-resistant, electrically-insulating lacquer.

9. The method of claim 1, further comprising the step of pre-heating the image carrier sheet prior to the step of establishing the vacuum.

10. The method of claim 1, wherein the step of heating the image carrier sheet is carried out by a flexible heating element provided on the flexible membrane.

11. The method of claim 1, wherein the flexible membrane comprises silicone rubber.

12. The method of claim 1, wherein the step of heating the image carrier sheet is carried out by a flexible heating element on the image carrier sheet.

* * * * *